United States Patent
Meier

(10) Patent No.: US 6,776,395 B1
(45) Date of Patent: Aug. 17, 2004

(54) PROPORTIONAL VALVE THAT CAN BE ACTUATED ELECTROMAGNETICALLY

(75) Inventor: Dietmar Meier, Tiefenbronn (DE)

(73) Assignee: Bosch Rexroth AG, Lohr am Main (DE)

( * ) Notice: Subject to any disclaimer, the term of this patent is extended or adjusted under 35 U.S.C. 154(b) by 152 days.

(21) Appl. No.: 10/149,297

(22) PCT Filed: Nov. 9, 2000

(86) PCT No.: PCT/DE00/03917
§ 371 (c)(1),
(2), (4) Date: Jun. 10, 2002

(87) PCT Pub. No.: WO01/42691
PCT Pub. Date: Jun. 14, 2001

(30) Foreign Application Priority Data

Dec. 8, 1999 (DE) .......................... 199 59 021

(51) Int. Cl.⁷ .............................................. F16K 31/02
(52) U.S. Cl. ................... 251/367; 251/129.08; 277/628
(58) Field of Search ........................... 251/367, 129.08, 251/129.15; 137/884; 277/628; 303/119.1, 119.2, 119.3

(56) References Cited

U.S. PATENT DOCUMENTS

| | | | | |
|---|---|---|---|---|
| 3,717,179 A | * | 2/1973 | Clark .................... | 137/625.65 |
| 3,720,420 A | * | 3/1973 | Jelinek et al. .............. | 277/638 |
| 3,814,126 A | * | 6/1974 | Klee .......................... | 137/884 |
| 5,048,569 A | * | 9/1991 | Stoll et al. ............. | 137/625.64 |
| 5,094,268 A | * | 3/1992 | Morel et al. ................ | 137/560 |
| 5,127,440 A | * | 7/1992 | Maas et al. .................. | 137/884 |
| 5,269,490 A | * | 12/1993 | Fujikawa et al. ...... | 251/129.15 |
| 5,449,227 A | * | 9/1995 | Steinberg et al. ........ | 303/119.2 |
| 5,853,231 A | * | 12/1998 | Iwamura et al. ......... | 303/119.2 |
| 5,965,249 A | | 10/1999 | Sutton et al. | |
| 6,149,164 A | * | 11/2000 | Kreutz ....................... | 277/628 |
| 6,293,634 B1 | * | 9/2001 | Hosoya ................... | 303/119.2 |
| 6,412,754 B1 | * | 7/2002 | Ogino et al. ........... | 251/129.15 |
| 6,454,267 B1 | * | 9/2002 | Gaines et al. ............... | 277/312 |

FOREIGN PATENT DOCUMENTS

| | | |
|---|---|---|
| DE | 19 27 467 A | 12/1970 |
| DE | 38 29 992 A | 3/1990 |
| DE | 44 12 665 A1 | 10/1995 |
| DE | 42 32 205 C2 | 5/1996 |
| GB | 807 547 A | 1/1959 |

* cited by examiner

Primary Examiner—John Bastianelli
(74) Attorney, Agent, or Firm—Michael J. Striker

(57) ABSTRACT

An electromagnetically actuatable proportional valve (10) includes a valve part (14) with an actuator that controls pressure fluid connections, an actuator solenoid (12), and with a set of control electronics (16), controls the activation of the coil. The control electronics (16) are flanged mounted onto the actuator solenoid (12) or the valve part (14) and is thereby exposed to mechanical and/or hydro-mechanical vibrations. In order to vibrationally decouple the control electronics (16) from the valve part (14) and/or the actuator solenoid (12) at least one vibration-damping means in the form of a damping plate (18) between these components and the control electronics (16) is provided.

8 Claims, 2 Drawing Sheets

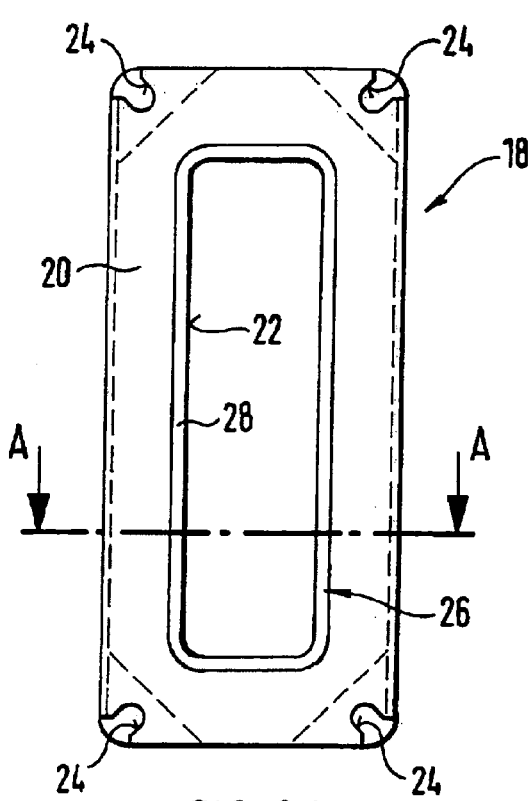
FIG. 2.1
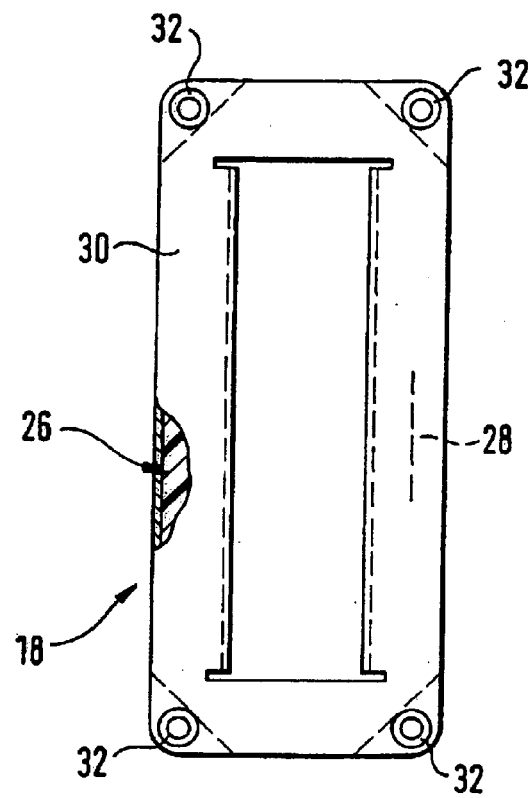
FIG. 2.2
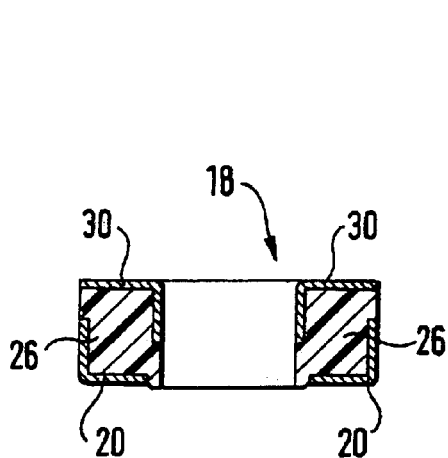
FIG. 2.3
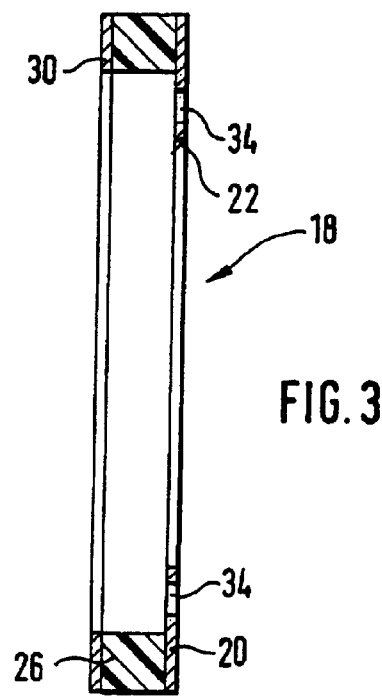
FIG. 3

PROPORTIONAL VALVE THAT CAN BE ACTUATED ELECTROMAGNETICALLY

BACKGROUND OF THE INVENTION

The invention is based on an electromagnetically actuatable proportional valve. Proportional valves of this kind are used, for example, as pressure controllers or flow regulators in hydraulic control circuits.

An electromagnetically actuatable proportional valve is already known, for example, from DE 38 29 992 A1. This known proportional valve is comprised of an actuator solenoid with a coil and armature, a valve part with a movably guided actuator that can be acted on by the armature, and a set of control electronics for controlling the activation of the armature by means of the coil. The control electronics are flange mounted to the housing of the actuator solenoid. Mechanical and/or hydro-mechanical vibrations that are produced, for example, by pumps and their pressure pulsations or by the switching processes of adjacent switching devices, are transmitted via the housing of the actuator solenoid to the wired components, the lines, and the plug connectors of the control electronics. The accelerations that occur can increase the stresses on these components, causing damage that in the extreme case can lead to the total failure of the control electronics. So that the electronic components withstand these vibrations, complex measures are taken, for example the components are cast or glued in place during the production of the control electronics. Such measures, however, are costly and often insufficient.

A SUMMARY OF THE INVENTION

An electromagnetically actuatable proportional valve has the advantage over the prior art that the transmission paths of the vibrations to the control electronics are interrupted or at least damped. The measures explained above for vibration-proof anchoring of electronic components to the circuit substrates can therefore be reduced and under some circumstances, entirely eliminated.

Other advantages or advantageous modifications of the invention ensue from the dependent claims and the specification. For example, embodying vibration-damping means in the form of a damping plate achieves a particularly high degree of effectiveness and a simultaneously inexpensive manufacture and simple operation. Disposing the fastening devices one above the other on the fastening flanges also permits a damping plate to be retrofitted onto existing electromagnetically actuatable proportional valves. In addition, the anchoring of the damping plate requires only a minimum of space.

BRIEF DESCRIPTION OF THE DRAWING

Exemplary embodiments of the invention are shown in the drawings and will be explained in detail in the subsequent description.

FIG. 2 shows several views of a damping plate as a separate part, FIG. 3 shows a second exemplary embodiment for a damping plate, likewise in several different views.

DETAILED DESCRIPTION OF THE PREFERRED EMBODIMENTS

Figure 1:
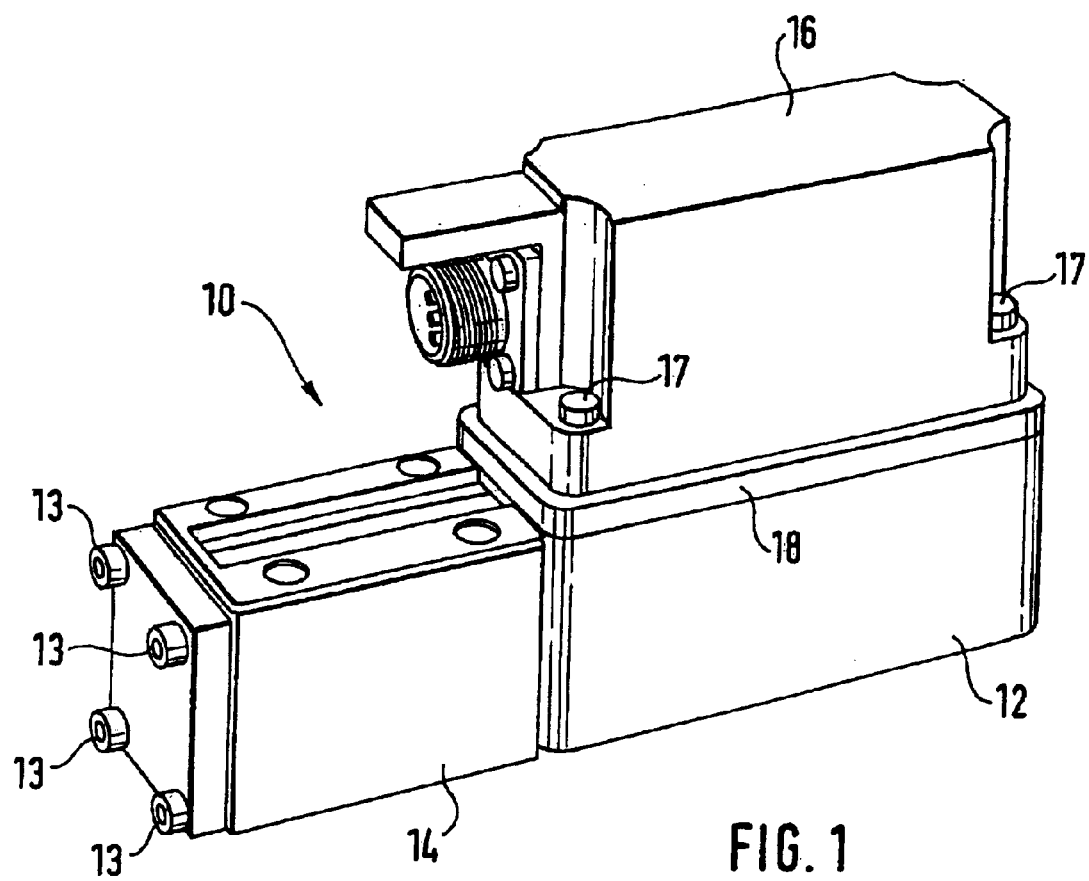
FIG. 1 shows a perspective representation of an electromagnetically presettable proportional valve embodied according to the invention.

The electromagnetically actuatable proportional valve 10 according to FIG. 1 is a structural unit comprised of an actuator solenoid 12, a valve part 14 connected to it with the aid of tie bolts 13, and a set of control electronics 16. The control electronics 16 are attached to a side surface of the actuator solenoid 12 by means of screws 17. Between the two components, a damping plate 18 is provided, which vibrationally decouples the actuator solenoid 12 from the control electronics 16. The design of the damping plate 18 is shown in two exemplary embodiments in different views in FIGS. 2 and 3.

FIG. 2.1 shows the damping plate 18 from underneath, i.e. from its side oriented toward the actuator solenoid 12. A first fastening flange 20 is shown, which is provided to embody a frame piece with a central opening 22. The fastening flange 20 is preferably made of metal and is essentially rectangular in its external form. In the vicinity of the corners of this external form, grooves 24 are provided, which open toward the outside, extend along the diagonal of the fastening flange 20, and have rounded ends. The width of the groove 24 is matched to the diameter of the shaft of the fastening screws, which are inserted into the grooves 24 from the outside in order to anchor the damping plate 18 to the actuator solenoid 12 (FIG. 1). The edge regions around the grooves 24 thus serve to support the screw heads.

FIG. 1 indicates the outer contour of an elastomer part 26, depicting it with dashed lines because it is only indirectly visible in this view, which is vulcanized onto the side of the fastening flange 20 oriented away from the plane of the drawing. This elastomer part 26 protrudes partly into the opening 22 and constitutes a circumferential collar 28 that protrudes beyond the fastening flange 20 and seals the parting plane between the actuator solenoid 12 and the damping plate 18. In the vicinity of the corners, the elastomer part 26 is provided with recesses so that the grooves 24 of the damping plate 18 are left unobstructed.

The top view of the damping plate 18 depicted in FIG. 2.2 shows a second fastening flange 30, which is disposed on the opposite side of the elastomer part 26 from the first fastening flange 20 and is likewise vulcanized onto the elastomer part 26. As a result of this connection, the two fastening flanges 20 and 30 can move in relation to each other so that vibrations, which are introduced into the system by the first fastening flange 20 are transmitted to the second fastening flange 30 in a sharply damped form, if at all. The outer contours of the two fastening flanges 20, 30 are congruent and threaded sleeves 32 are provided in the vicinity of the corners of the second fastening flange 30. These threaded sleeves are placed concentric to the rounded ends of the grooves 24 of the first fastening flange 20 and are likewise accommodated in recesses in the elastomer part 26. The threaded sleeves 32 are advantageously connected to the second fastening flange 30 by means of caulking. They abut the second fastening flange 30 and extend toward the first fastening flange 20 without touching it. This assures the relative mobility of the fastening flanges 20, 30. Between the end of the threaded sleeves 32 and the first fastening flange 20, a space is left, which is greater than the height of the screw head of a screw accommodated in the groove 24 of the first fastening flange 20.

The second fastening flange 30 is oriented toward the control electronics 16, which are anchored to the damping plate 18 by screws, which are screwed into the threaded sleeves 32. Before this screw-mounting procedure takes place, the screws accommodated in the grooves 24 of the first testing flange 20 must be screwed into the screw threads provided for them in the actuator solenoid 12 by means of a tool that is not shown. Advantageously, a tool can be used for this, which can be inserted through the core hole of the threaded sleeves 32 of the second fastening flange 30.

The concentric placement of grooves 20 in relation to the threaded sleeves 32 in connection with a screw-mounting procedure that takes place through the opening of the threaded sleeves 32 achieves a particularly space-saving design of the damping plate 18. In addition, this permits a damping plate 18 of this kind to be retrofitted onto existing electromagnetically actuatable proportional valves 10.

The cross section through the damping plate 18, which is depicted in FIG. 2.3 and runs along the sectional line A—A according to FIG. 1, shows that the fastening flanges 20 and 30 are comprised of angle sections. These angle sections are disposed point-symmetrically opposite each other and with their legs, at least partially define the inner and outer contours of the damping plate 18. The intermediary space between the two angle sections is filled by the elastomer part 26 so that the damping plate 18 as a whole has a solid rectangular cross section. Naturally, the fastening flanges 20, 30 are not limited to the equal-sided angle sections shown. If need be, hollow spaces can also be provided in the elastomer part 26 whose shape and disposition can be used to influence the elasticity of the elastomer part 26 in a manner specific to the intended use.

Furthermore, instead of being made of angle sections, the fastening flanges 20, 30 can also be made of flat band material. FIG. 3 shows an embodiment of this kind. This second embodiment differs from the above-described first embodiment also in that instead of the grooves 24 in the fastening flange 20, through openings 34 are provided on the side oriented toward the actuator solenoid 12. These through openings 34 are embodied in the region of the first fastening flange 20 enclosed inside the elastomer part 26 and this fastening flange 20 has an opening 22, which is correspondingly smaller in size than in the first exemplary embodiment. In order to anchor the control electronics 16 onto the damping plate 18, threaded sleeves 32 are likewise provided in the corner regions of the second fastening flange 30, but are not shown in FIG. 3.

Naturally, other changes or additions to the exemplary embodiments described above are possible without venturing beyond the scope of the invention.

What is claimed is:

1. An electromagnetically actuatable proportional valve (10) comprised of an actuator solenoid (12), a valve part (14) built onto the actuator solenoid for controlling pressure fluid connections, and a set of control electronics (16), which is flange mounted onto the actuator solenoid (12) or the valve part (14) and controls the activation of the actuator solenoid, wherein at least one vibration-damping means (18) is provided between the control electronics (16) and the actuator solenoid (12) and/or the valve part (14), wherein the vibration-damping means is a damping plate (18) comprised of (20, 30) and an elastomer part (26), wherein said elastomer part is disposed between the two fastening flanges (20, 30) and is anchored to them.

2. The electromagnetically actuatable proportional valve according to claim 1, wherein the fastening flanges (20, 30) are made of metal and that the elastomer part (26) is vulcanized onto these fastening flanges (20, 30).

3. The electromagnetically actuatable proportional valve according to claim 1, wherein the two fastening flanges (20, 30) are comprised of frame parts constituted by angle sections, wherein said angle sections are disposed point-symmetrically in relation to each other and define the contour of the damping plate (18).

4. The electromagnetically actuatable proportional valve according to claim 1, wherein the fastening flanges (20, 30) have an essentially rectangular external form and are provided in the vicinity of their corners with fastening devices (24, 32), and that the elastomer part (26) has recessed in the vicinity of these corners.

5. The electromagnetically actuatable proportional valve according to claim 4, wherein the fastening devices oriented toward the control electronics (16) are threaded sleeves (32) into which screws can be inserted for fastening the damping plate (18) to the control electronics (16) and that the fastening devices oriented toward the actuator solenoid (12) or the valve part (14) are groves (24) that extend diagonally and are open toward the circumference, into which screws can be inserted radially from the outside in order to anchor the damping plate (18) to the actuator solenoid (12) or the valve part (14).

6. The electromagnetically actuatable proportional valve according to claim 5, wherein the width of the groove (24) is matched to the shaft diameter of the screws to be inserted, wherein the end of the groove (24) is rounded, and wherein the depth of the groove (24) is of such a size that the screw heads, in an end position, are positioned essentially concentric to the opposing threaded sleeves (32), without touching the opposing threaded sleeves.

7. The electromagnetically actuatable proportional valve according to claim 6, wherein in order to actuate the screws for anchoring the first fastening flange 920) to the actuator solenoid (12) or the valve part (14), a tool is provided, when wherein the tool can be inserted through the core hole of the threaded sleeves (32) of the second fastening flange (30).

8. The electromagnetically actuatable proportional valve according to claim 1, wherein the proportional valve (10) controls hydraulic pressure fluid.

* * * * *